US011646468B2

(12) United States Patent
Zhang et al.

(10) Patent No.: US 11,646,468 B2
(45) Date of Patent: *May 9, 2023

(54) WEARABLE BATTERY PACK

(71) Applicant: Nanjing Chervon Industry Co., Ltd., Nanjing (CN)

(72) Inventors: Yuexiang Zhang, Nanjing (CN); Xiaohong Lin, Nanjing (CN); Xiangyang Zhao, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 98 days.

This patent is subject to a terminal disclaimer.

(21) Appl. No.: 17/221,425

(22) Filed: Apr. 2, 2021

(65) Prior Publication Data

US 2021/0226288 A1 Jul. 22, 2021

Related U.S. Application Data

(63) Continuation of application No. 16/424,112, filed on May 28, 2019, now Pat. No. 10,998,596, which is a
(Continued)

(30) Foreign Application Priority Data

Jan. 17, 2017 (CN) .......................... 201710030447.7
Sep. 30, 2017 (CN) .......................... 201710938714.0

(51) Int. Cl.
*H01M 50/24* (2021.01)
*H01M 10/613* (2014.01)
(Continued)

(52) U.S. Cl.
CPC .............. *H01M 50/24* (2021.01); *A45F 3/08* (2013.01); *A45F 3/10* (2013.01); *A45F 3/14* (2013.01);
(Continued)

(58) Field of Classification Search
CPC .... H01M 50/20; H01M 50/24; H01M 50/245; H01M 10/613; A45F 3/08; A45F 3/10; A45F 3/11; A45F 3/14
See application file for complete search history.

(56) References Cited

U.S. PATENT DOCUMENTS 10,998,596 B2 * 5/2021 Zhang ........................ A45F 3/10
2015/0194647 A1 7/2015 Yoshinari et al.
2015/0228940 A1 8/2015 Fujisawa

FOREIGN PATENT DOCUMENTS

CN       201994351 U    9/2011
CN       104303331 A    1/2015
(Continued)

OTHER PUBLICATIONS

International Search Report from International Application PCT/CN2017/120432 dated Mar. 23, 2018, 3 pgs.
(Continued)

*Primary Examiner* — Amanda C. Walke
(74) *Attorney, Agent, or Firm* — Greenberg Traurig, LLP

(57) ABSTRACT

A wearable battery pack includes a battery pack body, a battery cell and a housing accommodating a battery cell and a wearable device capable of wearing so that the battery pack body at least be worn on a user's back. The battery pack body has a heat dissipation channel running through one side of the battery pack body to the opposite side. The side of the battery pack body which is penetrated by the heat dissipation channel is located between the back of the user and the other side when the user carries the battery pack body.

19 Claims, 17 Drawing Sheets

Related U.S. Application Data continuation of application No. PCT/CN2017/120432, filed on Dec. 31, 2017.

(51) Int. Cl.
*A45F 3/08* (2006.01)
*A45F 3/10* (2006.01)
*A45F 3/14* (2006.01)
*H01M 50/256* (2021.01)
*H01M 50/247* (2021.01)
*H01M 50/20* (2021.01)

(52) U.S. Cl.
CPC ......... *H01M 10/613* (2015.04); *H01M 50/20* (2021.01); *H01M 50/247* (2021.01); *H01M 50/256* (2021.01); *A45F 2003/146* (2013.01); *H01M 2220/30* (2013.01)

(56) References Cited

FOREIGN PATENT DOCUMENTS

| | | |
|---|---|---|
| CN | 10450417 A | 4/2015 |
| CN | 105322608 A | 2/2016 |
| CN | 106181901 A | 12/2016 |
| EP | 2886006 A1 | 6/2015 |
| JP | 2016081703 A | 5/2016 |

OTHER PUBLICATIONS

Translation of International Search Report from International Application PCT/CN2017/120432 dated Mar. 23, 2018, 4 pgs.
Full English translation of the written opinion issued in PCT/CN2017/120432, dated Mar. 23, 2018, 4 pgs.

\* cited by examiner

A-A

B-B

WEARABLE BATTERY PACK

RELATED APPLICATION INFORMATION

This application claims the benefit of and is a continuation of U.S. patent application Ser. No. 16/424,112, filed on May 28, 2019, which application claims the benefit of is a continuation of International Application Number PCT/CN2017/120432, filed on Dec. 31, 2017, which application claims the benefit of Chinese Patent Application CN 201710030447.7, filed on Jan. 17, 2017, and Chinese Patent application number 201710938714.0, filed on Sep. 30, 2017, the disclosures of which are incorporated herein in their entirety by reference.

TECHNICAL FIELD

The present disclosure generally relates to the battery pack, and more particularly to a wearable battery pack.

BACKGROUND

Battery pack, as the power source of portable electric tools, has always been the main link restricting the development of portable electric tools. Previous battery packs have a low output voltage, which will cause the problem of insufficient power and poor endurance when driving high-power electric tools.

However, when the number of cells is increased, and the output voltage of the battery pack is increased, the size and weight of the battery pack will increase correspondingly, which will affect the comfort of the user's shoulder and make it difficult for users to use power tools flexibly. And with increasing numbers of cells, the internal heat during charging and discharging of the battery pack is increased.

Therefore, it is necessary to design a wearable battery pack with good heat-dissipation for users to carry comfortably.

The statements in this section merely provide background information related to the present disclosure and may not constitute prior art.

SUMMARY

In one aspect of the disclosure, a wearable battery pack includes: a battery pack body comprising a battery cell and a housing accommodating the battery cell. A wearable device, which is configured to wear for the user so that the battery pack body can be carried on the user's back. The battery pack body is provided with a heat dissipation channel, extending from one side of the battery pack body to the opposite side. The side of the battery pack body, which is penetrated by the heat dissipation channel is located between the back of the user and the other side when the user carries the battery pack body.

In another aspect of the disclosure, a wearable battery includes: a battery pack body comprising a plurality of battery cells and housing for holding the battery cells; a carrying device for putting it on the back of the user. A first locking device is formed with a first locking portion. A second locking device, which is formed with a second locking portion, has a locked state and an unlocked state. The second locking portion locks the first locking portion in the locked state to maintain the relative positions of the first locking device and the second locking device. While in the unlocked state, the first locking portion is unlocked to enable the first locking device to disengage from the second locking device, wherein the first locking device is fixedly connected to the battery pack device. The second locking device is fixedly connected to the carrying device. The second locking device includes an operating portion for the user to control the second locking portion so that the user might detach the battery pack device from the carrying device when necessary.

In another aspect of the disclosure, a wearable battery pack includes a carrying device, which is used for enabling the battery pack to be carried on a user's back; a plurality of battery cells, which are used for supplying electrical energy; a battery housing comprising a front housing and a rear housing, the rear housing used for combining with the front housing to form a space capable of accommodating the battery cell; an elastic member, which is arranged between the front housing and the rear housing, configured to seal the joint of the front housing and the rear housing.

Further areas of applicability will become apparent from the description provided herein. It should be understood that the description and specific examples are intended for purposes of illustration only and are not intended to limit the scope of the present disclosure.

BRIEF DESCRIPTION OF DRAWINGS

The drawings described herein are for illustrative purposes only of exemplary examples and not all possible implementations and are not intended to limit the scope of the present disclosure. Corresponding reference numerals indicate corresponding parts throughout the several views of the drawings.

DETAILED DESCRIPTION

The following description of the preferred examples is merely exemplary in nature and is in no way intended to limit the disclosure, its application, or uses.

Figure 1:
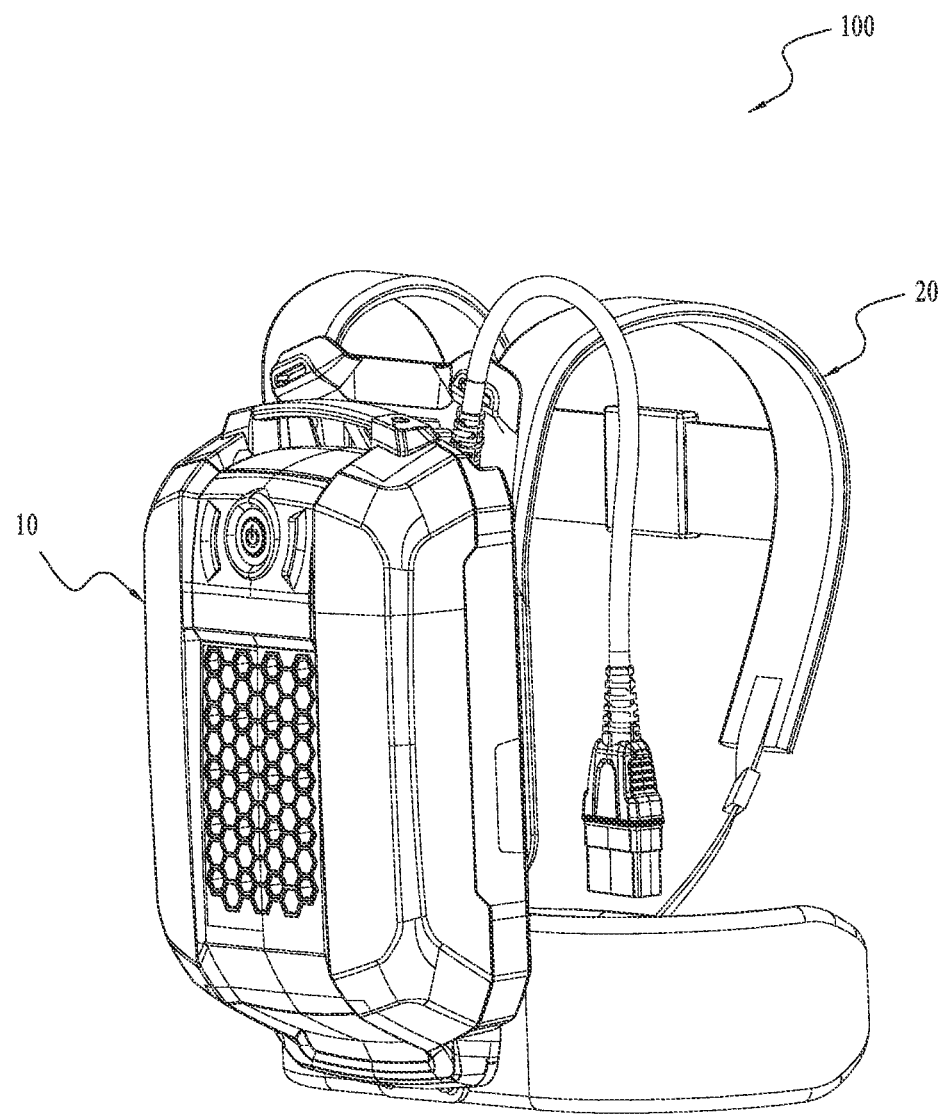
FIG. 1 is a structural view of a wearable battery pack of one of the examples.

As shown in the FIG. 1, a wearable battery pack 100 includes a battery pack body 10 and a wearable device 20. The battery pack body 10 is configured to provide a power source for a power tool. The wearable device 20 is worn on the back of the user to carry the battery pack body 10 so that the user can operate the power tool conveniently.

Figure 2:
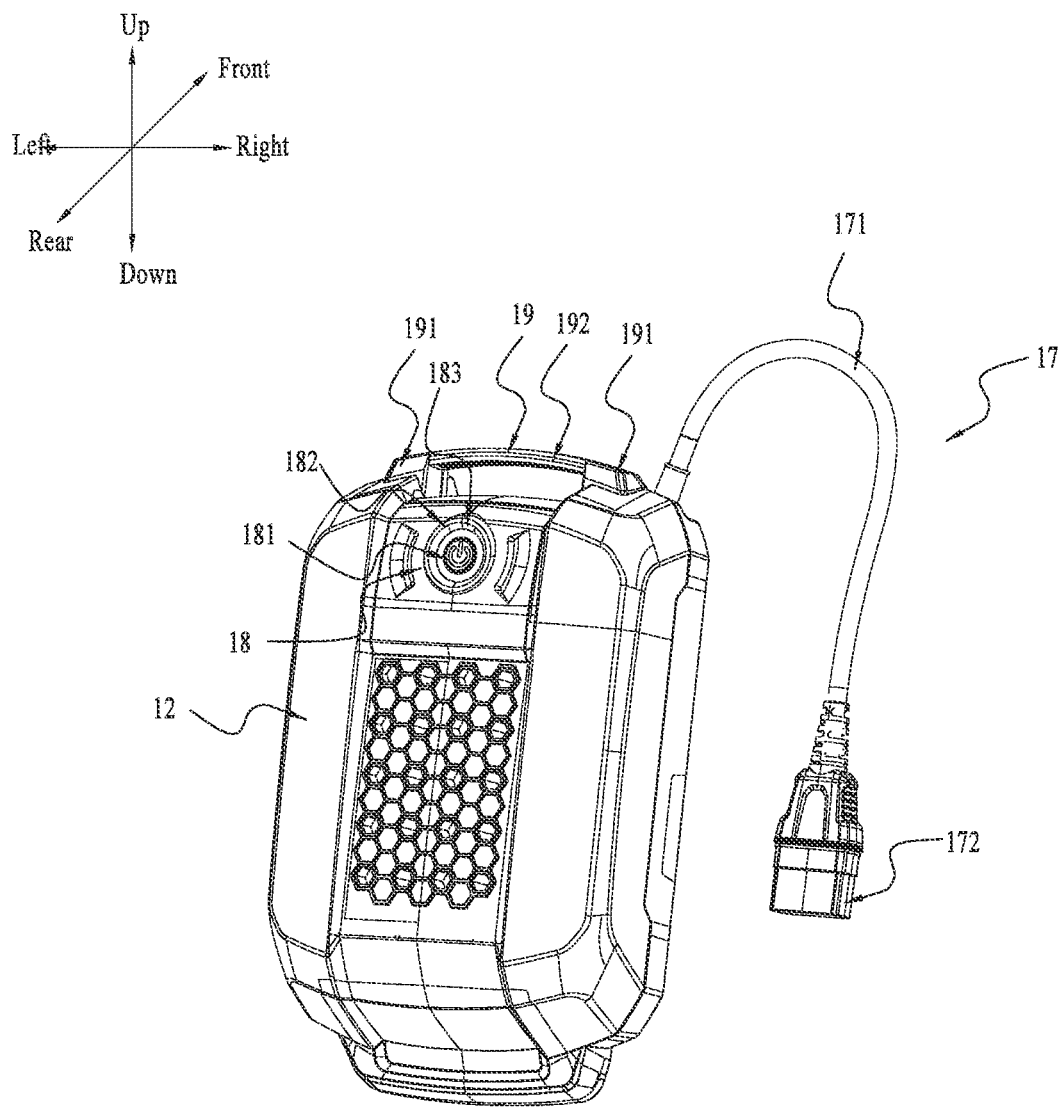
FIG. 2 is a structural view of the battery pack body in FIG. 1.

For the convenience of description, as shown in FIG. 2, the directions when the battery pack body 10 is worn on the user's back are defined as "up", "down", "above", "below", "left", "right", etc. The side close to the user's back is defined as the front, and the side far from the user's back is defined as the rear.

Figure 3:
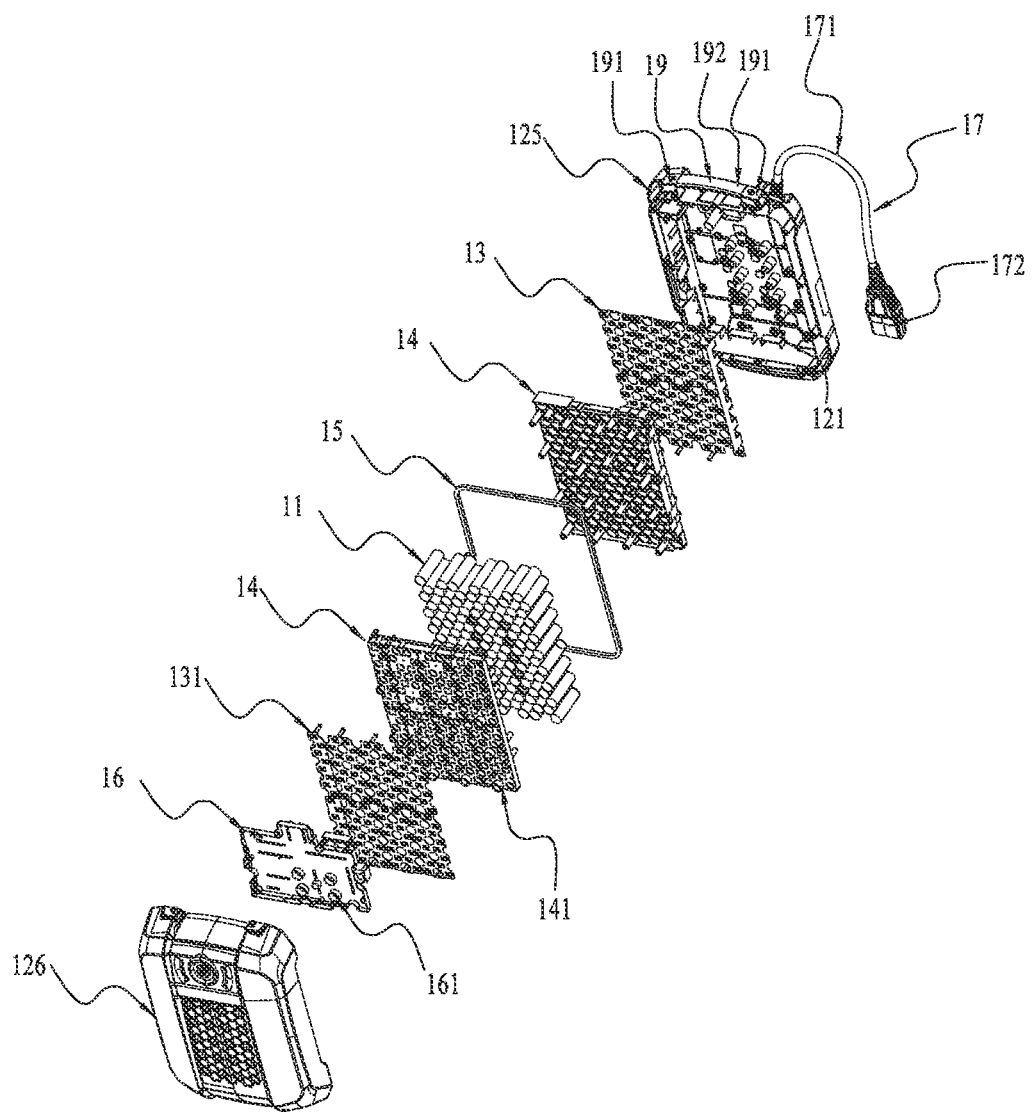
FIG. 3 is an exploded view of the battery pack body in FIG. 2.

The battery pack body 10 includes a battery cell 11 and a housing 12. The housing 12 is generally box-shaped and the battery cell 11 is accommodated in the housing 12. The battery pack body 10 has a large electrical capacity, and it includes a plurality of battery cells 11 connected in parallel or series. The battery cells 11 are connected in series or parallel with the connectors 13 so that the battery pack body 10 could output a large amount of electric energy. Specifically, the output voltage of the battery pack body 10 is at least 56V. The battery cell 11 employs a cylindrical rechargeable lithium battery as shown in FIG. 3 with a nominal voltage of 4V. The battery pack 100 has a large electrical energy capacity, and the ratio of its power capacity to the total mass of the battery pack is greater than 120 Wh/Kg. Further, the ratio of the power capacity of the battery pack body to the total mass of the battery pack body is greater than 140 Wh/Kg.

In order to arrange the battery cell 11 in a certain form, as shown in FIG. 3, the battery pack body 10 further includes a frame 14 for supporting the battery cell 11, so that the plurality of battery cells 11 are integrally assembled into the housing 12. Specifically, the battery cell 11 is disposed along the front-rear direction of the housing 12, that is, the length direction of the battery cell 11 is parallel to the front-rear direction of the housing 12. It ensures that the structure of the housing 12 is compact in the anterior-posterior plane and could hold enough battery cells 11, thus, enabling the battery pack body 10 with enough electric energy. The side of the frame 14 far away from the battery cell 11 is further provided with a support column 141 for reducing the vibration as the battery pack drops and enhancing the anti-drop performance of the battery pack. An insulator 131 is disposed between the frame 14 and the main circuit board 16. The front-rear direction is defined as the direction of the height of the battery housing, and the left-right direction is defined as the direction of the width of the battery housing. The ratio of the length of the battery cell unit to the width of the housing is greater than 1.5. Therefore, the structure of the battery pack is more compact in the anterior-posterior plane, meanwhile, it provides sufficient accommodation space. Thus, the user avoided being burdened by the battery pack because of the thick battery pack.

Figure 4:
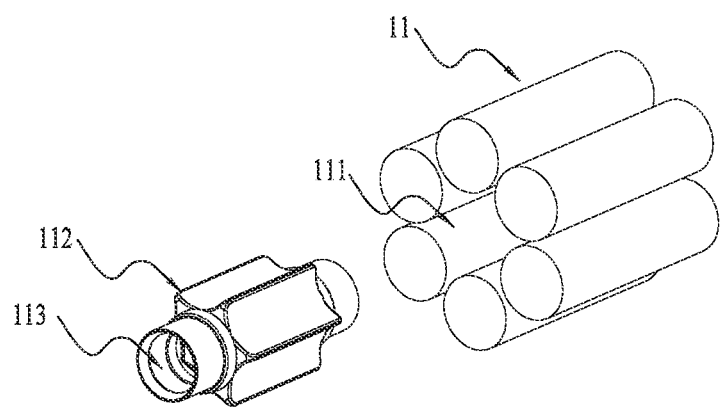
FIG. 4 is a structural view of the arrangement of the battery cell of the battery pack body in FIG. 1.

Referring to FIG. 4, a plurality of the battery cells 11 are arranged around forming a cell channel 111, and a heat dissipation space formed between the battery cells 11 make ventilating them easier. Specifically, each of the six battery cells 11 surrounds, forming a hexagonal structure. The center of the hexagonal structure is the cell channel 111. More specifically, a heat conducting block 112 is arranged in the cell channel 111, and the heat conducting block 112 forms a heat conductor 113 for heat dissipation. As the heat conducting block 112 placed in the cell channel 111, the heat conducting block 112 conducts the heat of the cell. And airflow is formed in the direction parallel to the length of the cell through the heat conductor 113 to accelerate the heat dissipation of the battery cell 11. The heat conductor 113 is arranged relative to the cell channel such that the housing passage penetrates the heat conduction passage 113. The heat conduction of the battery cell 11 is accelerated by the heat conducting block 112, thus accelerating the heat dissipation of the battery pack.

The battery pack body 10 is provided with a heat dissipation channel 124 that penetrates from one side of the battery pack body 10 to the opposite side. The side through which the battery pack body 10 penetrated by the heat dissipation channel 124 is located between the user's back and the other side when the user is carrying the battery pack body 10. Specifically, the housing 12 forms a heat dissipation passage 124 running through the front side of the battery pack body 10 to the opposite rear side. The heat dissipation channel 124 penetrates the cell channel 111 to enable the external airflow to flow in the front-rear direction of the battery pack body 10 such that the airflow passes between the back of the user and the front surface. It is reducing the heat, which is caused by the increase of the internal temperature of the battery pack body 10, transmitted to the user's back. It is thus preventing the user's back from getting hot and sweating.

Figure 5:
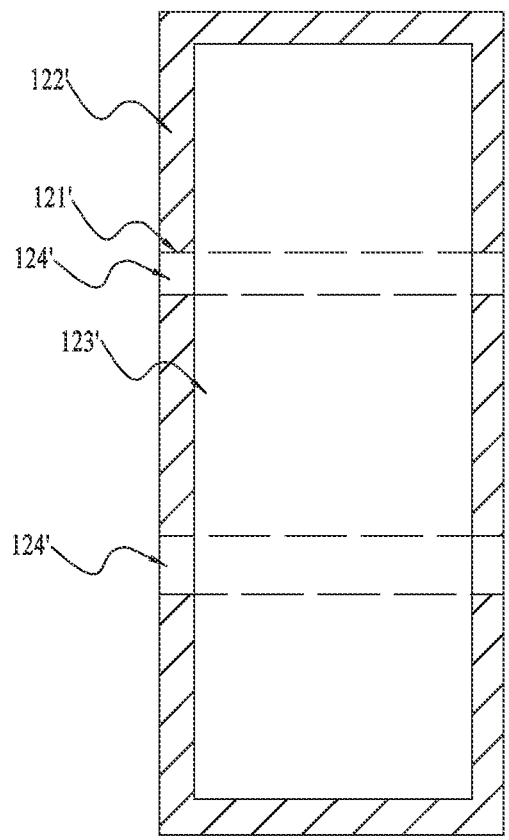
FIG. 5 is a structural view of a heat-dissipation channel and housing of one of the examples.

As shown in FIG. 5, as an example, the battery pack body 10 includes a first shell wall 121' and a second shell wall 122'. The first shell wall 121' is provided with a heat dissipation channel 124' running through the front side of the battery pack body 10 to the back side, and the second shell wall 122' is used to form a receiving cavity 123' to hold the battery cell 11. The receiving cavity 123' is connected with the heat dissipation channel 124'.

Figure 6:
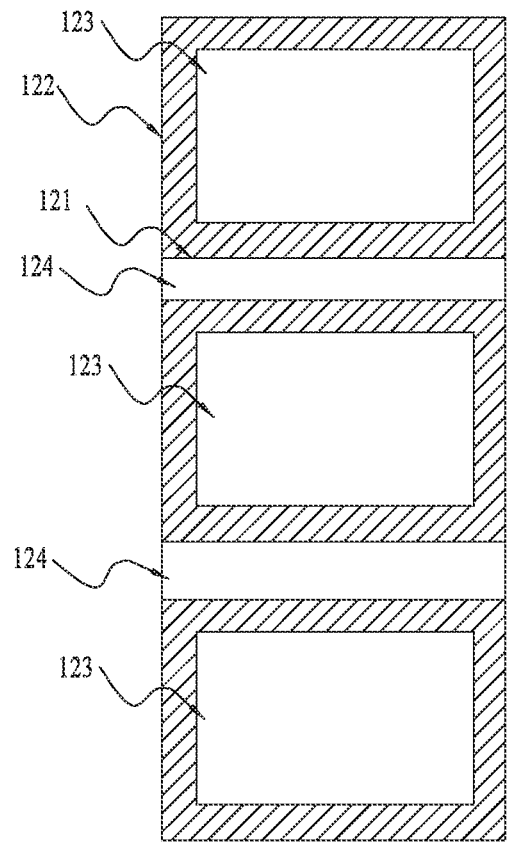
FIG. 6 is a structural view of a heat-dissipation channel and housing of another example.
Figure 8:
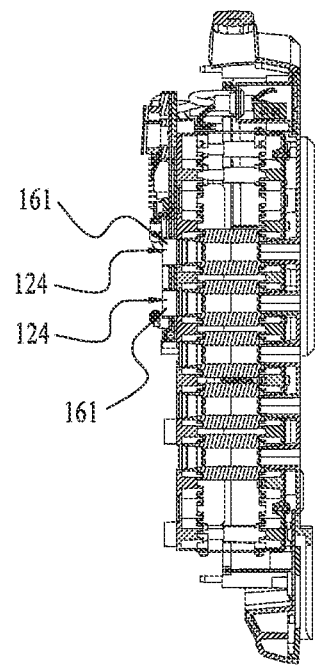
FIG. 8 is a cross-sectional view of the battery pack body taken along line A-A in FIG. 7.

As shown in FIG. 6 and FIG. 8, as another example, the housing 12 includes a first shell wall 121 and a second shell wall 122. The first shell wall 121 is at least used to form a heat dissipation channel 124 which runs through the front side of the battery pack body 10 to the back side. The second shell wall 122 is configured to form a receiving cavity 123 to contain the battery cell 11. And the receiving cavity 123 is sealed relative to the heat dissipation channel 124. In this way, when the air flow flows through the heat dissipation channel 124, it is possible to prevent external dust or water from entering the receiving cavity 123, which may cause damage to the battery cell 11. Specifically, the first shell wall 121 and the second shell wall 122 may be made of the same material. Alternatively, the first shell wall 121 and the second shell wall 122 may also be formed integrally.

Figure 7:
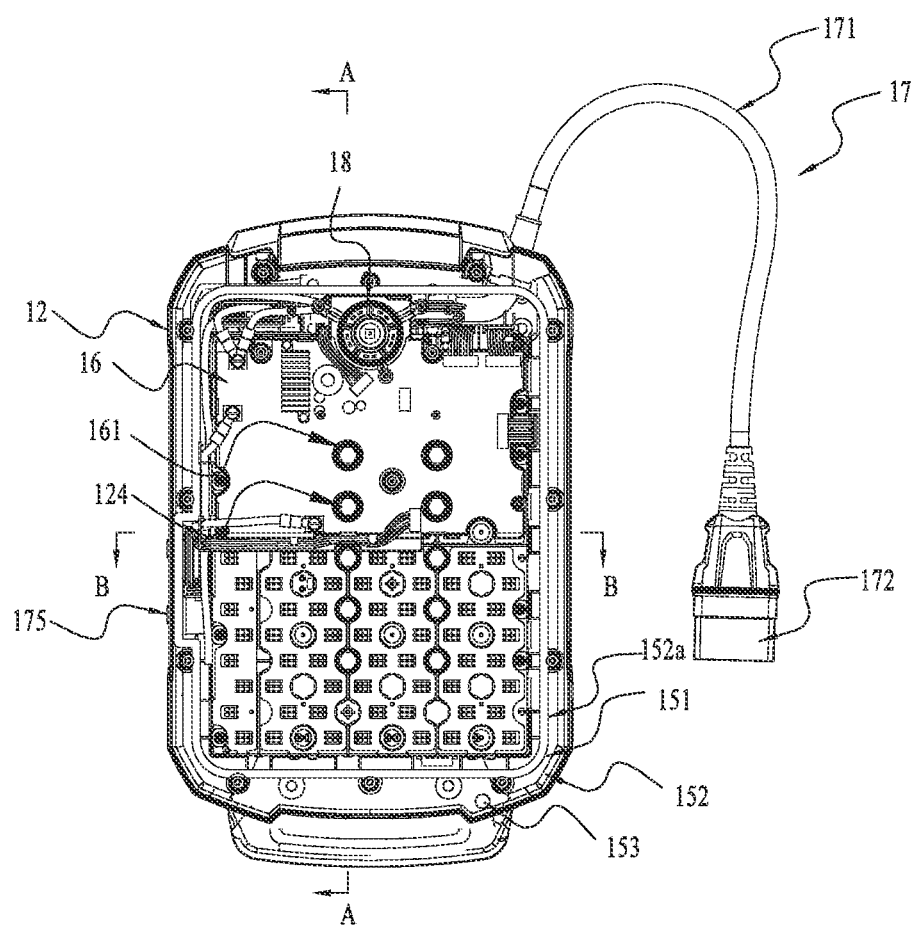
FIG. 7 is an internal structural view of the battery pack body without the front housing in FIG. 1.

It is defined that the maximum projective plane formed in the front-rear direction of the shell is the first projective plane and the maximum projective plane formed in the left-right direction is the second projective plane. The ratio of the sum of the areas of the projection surfaces formed in the front-rear direction of the heat dissipation channel 124 to the area of the first projective plane ranges from 0.004 to 0.012. Further, the ratio of the sum of the areas of the projection surfaces formed in the front-rear direction of the heat dissipation channel 124 to the area of the first projective plane ranges from 0.004 to 0.008. Further, the ratio of the sum of the areas of the projection surfaces formed in the front-rear direction of the heat dissipation channel 124 to the area of the first projective plane ranges from 0.008 to 0.012. Referring to FIG. 7, the battery pack body 10 further includes a main circuit board 16 for carrying the voltage conversion circuit and the control element. The main circuit board 16 is electrically connected to the battery cell 11. The electric energy that stored in the battery cell 11 is converted into a voltage required by the power tool or another electric device through the voltage conversion circuit carried on the main circuit board 16. The main circuit board 16 is arranged between the battery cell 11 and the housing 12. The plane on which the maximum surface of the main circuit board 16 is located is parallel to the maximum surface of the housing 12. Specifically, the main circuit board 16 is arranged between the insulator 13 and the rear side of the housing 12. And the direction of the main circuit board 16 is parallel to the rear surface of the housing 12, so as to reduce the internal space occupied by the main circuit board 16 while ensuring that the main circuit board 16 has sufficient control element placement area. The main circuit board 16 is provided with a through hole 161, which is arranged relative to the cell channel 111. And the heat dissipation channel 124 runs through the through hole 161 and the cell channel 111, so that the external airflow passes between the back of the user and the front surface, thereby reducing the heat transferred to the back of the user due to the elevated temperature inside the battery pack body 10.

The ratio of the sum of the areas of the projective surface formed in the front-rear direction of the through hole 161 to the area of the projective surface formed in the front-rear direction of the main circuit board 16 is in the range of 0.01 to 0.07. Further, the ratio of the sum of the areas of the projective surface formed in the front-rear direction of the through hole 161 and the area of the projective surface formed in the front-rear direction of the main circuit board 16 is in the range of 0.02 to 0.07.

As shown in FIG. 7, the battery pack body 10 also includes multiple interface devices 17 for power output or/and power input. The interface device 17 includes a cable 171. The cable 171 includes an external plug 172 being at one end of the cable for connecting to external devices such as power tools, as shown in FIG. 10 to FIG. 13; And an inner plug 173 is at the other end of the cable. The connectors 13 is electrically connected to the battery cell 11 such that the electrical energy of the battery cell 11 output through the positive electrode 13a and the negative electrode 13b of the connectors. The connecting joint 174 is connected to the positive electrode 13a and the negative electrode 13b of the connectors by wires.

Figure 10:
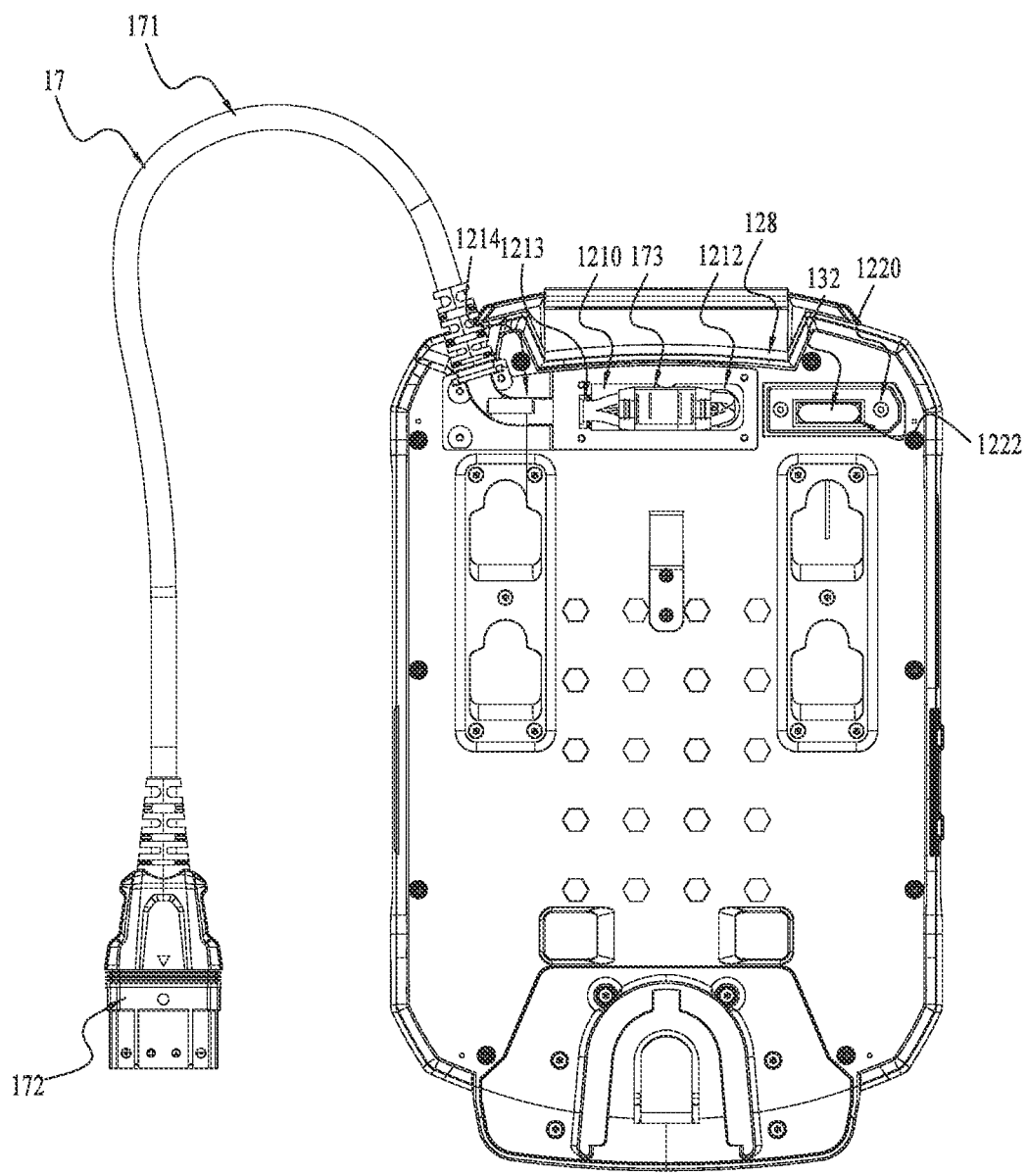
FIG. 10 is a front view of the battery pack body in FIG. 1
Figure 11:
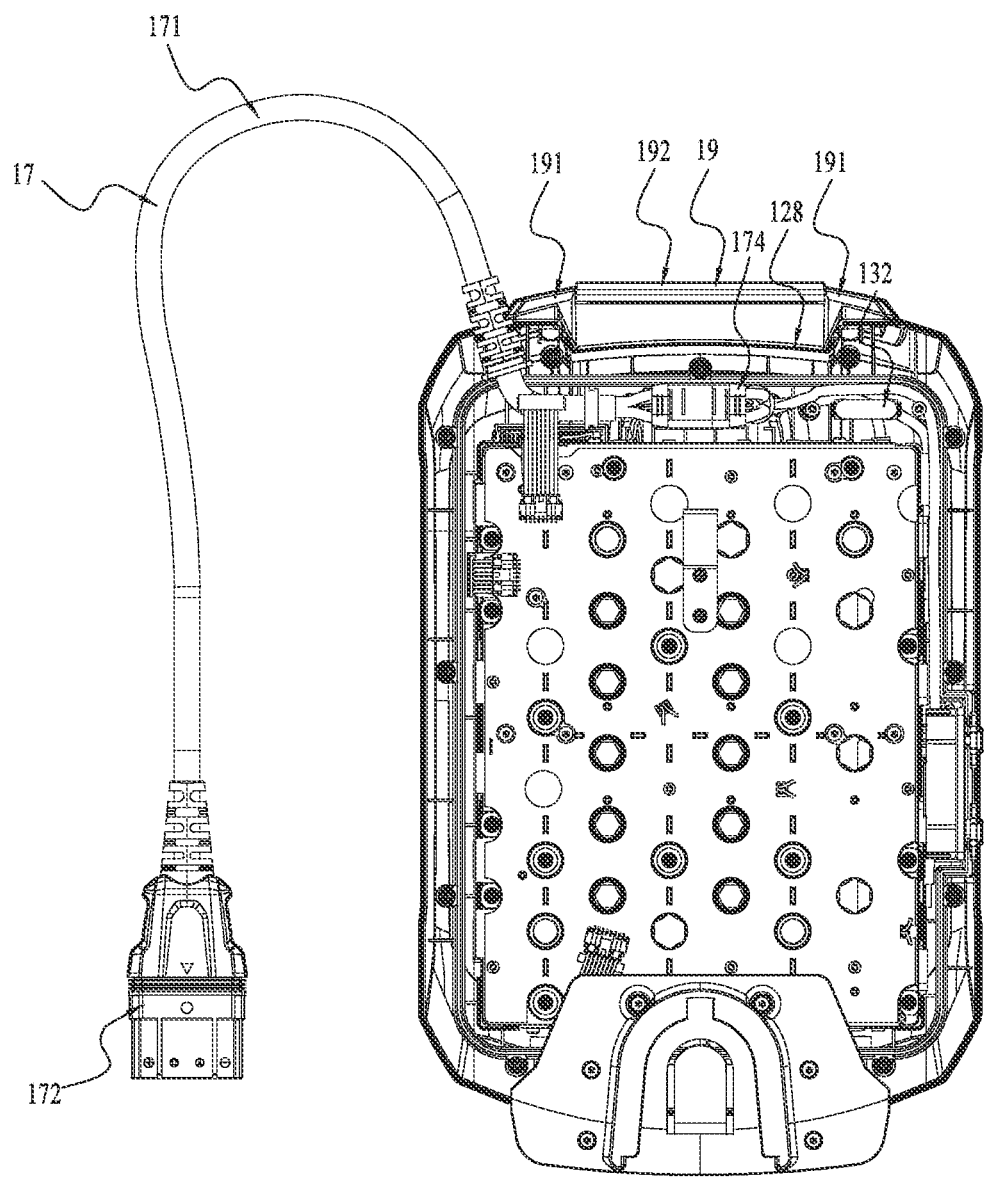
FIG. 11 is a rear view of the battery pack body without the main circuit board in FIG. 1.

As shown in FIG. 10 and FIG. 11, the housing 12 includes a first accommodating portion 1210 and a first sealing portion 1211. The first accommodating portion 1210 has a first receiving cavity 1212 capable of accommodating the inner plug 173, the connecting joint 174 and a part of electric wires. The innerplug 173 and a connecting head are located in the first receiving cavity 1212. The first sealing portion 1211 is used to seal the first receiving cavity 1212. Specifically, the first sealing portion 1211 detachably seals the first receiving cavity 1212. For example, the first sealing portion 1211 is fixed to the first sealing portion 1210 by a screw to seal the first receiving cavity 1212. Also, the first closure 1211 may also include a seal ring to seal the first receiving cavity 1212, thereby achieving the effect of dustproof and waterproof.

The first accommodating portion 1210 is located on the back of the housing 12 and near the top of the housing 12. The first accommodating portion 1210 defines an opening 1213. The electric wires being guided through the opening 1213 and extending along the upper part of the housing 12. More specifically, a card slot 1214 is arranged on the upper end of the housing 12 opposite to the opening 1213 to fix the cable. As the user is sitting on the ground and carrying the battery pack body 10 on his back; the structure prevents the cables from contacting the ground or other surfaces.

Figure 13:
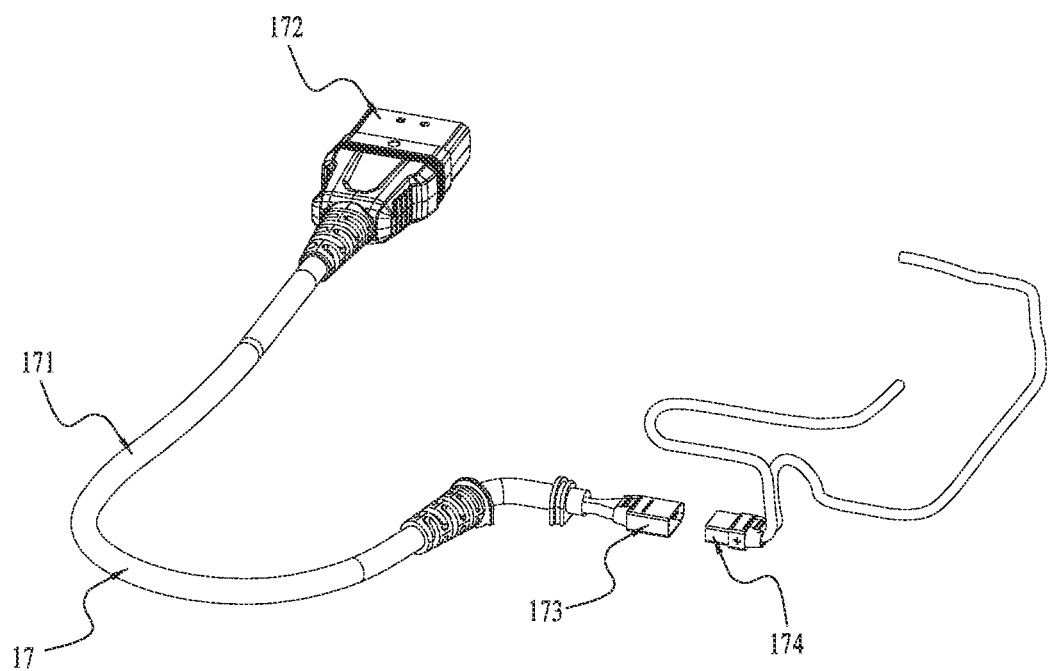
FIG. 13 is a structural view of a cable and a connector of the battery pack body.

Referring to FIG. 13, the inner plug 173 and the connecting joint 174 are a pair of plug-in connectors. When the cable needs to be replaced, the cable might be removed by disassembling the first sealing portion 1211, and splitting the inner plug 173 and the connecting joint 174, so that the replacement of the cable can be realized without dismantling the entire housing, which is convenient for maintenance.

The housing 12 also includes a second accommodating portion 1220 and a second sealing portion 1221. The second accommodating portion 1220 has a second receiving cavity 1222 capable of accommodating a fuse 132. One end of the fuse 132 is electrically connected to the connectors 13, and the other end is electrically connected to the connecting joint 174. Specifically, the connector 13 has a positive electrode 12a and a negative electrode 12b that output electric energy of the battery. One end of the fuse 132 is connected to the positive electrode 12a and the negative electrode 12b of the connectors via a wire, respectively. And the other end of the fuse 132 is connected to the connecting joint 174 via a wire. The second sealing portion 1221 is detachably coupled to the second accommodating portion 1220 to seal the second accommodating portion 1220. When the fuse 132 needs to be replaced, the fuse 132 is replaced only by taking apart the second sealing portion 1221.

The first accommodating portion 1210 and the second accommodating portion 1220 can also be integrated into one receiving cavity. The inner plug 173, the connecting joint 174, and the fuse 132 are all located in the same receiving cavity.

The external plug 172 of the cable might also be connected with the charger, and the battery 11 is charged by the charger when the battery pack body 10 is low.

The interface device 17 further includes a USB interface 175. One end of the USB interface 175 is electrically connected to the main circuit board 16, and the other end is used for accessing a power device with a USB interface, such as a mobile phone. The battery pack body 10 includes the cable 171 as the first interface device 17, and also includes other DC output interface as the second interface device 17. The first interface device 17 might supply the electricity for the battery cell 11 with a first voltage, and the second interface device 17 might supply the electricity for the battery cell 11 with a second voltage, the second voltage less than the first voltage. The second voltage might be 5V or 12V. As one of the examples, the second interface device 17 is electrically connected to the heating clothes. And the electric energy of the battery pack output through the second interface device to warm up the heating clothes.

The battery pack body 10 also includes a display device 18 for displaying the remaining battery. Specifically, the display device 18 is electrically connected to the main circuit board 16 and is disposed at a position close to the upper end of the housing 12 on the main circuit board 16, which is convenient for users to read while reducing the length of the connection. More specifically, the display device 18 includes a display switch 181 and a ring portion 182. The connection between the display device 18 and the main circuit board 16 is controlled by switching on or off of the display switch 181 to select whether to display the remaining power of the battery pack. The ring portion 182 is divided into several display units 183. And the remaining power of the battery pack body 10 is displayed by the number of lights of the display unit 183. The more the lights turned on of the display unit 183, the larger the remaining power of the battery pack body 10. To remind the user, different colors can be employed as the lighting of the display unit 183. For example, when the remaining power is sufficient, the display unit 183 is displayed in green, and when the remaining power is less, the display unit 183 is illuminated in red. Other display devices are capable of displaying the amount of electricity may also be employed, such as direct reading by the liquid crystal panel, etc.

The main circuit board 16 further includes a detection module for detecting the residual power of the battery cell, and the display device is electrically connected with the main circuit board.

Figure 14:
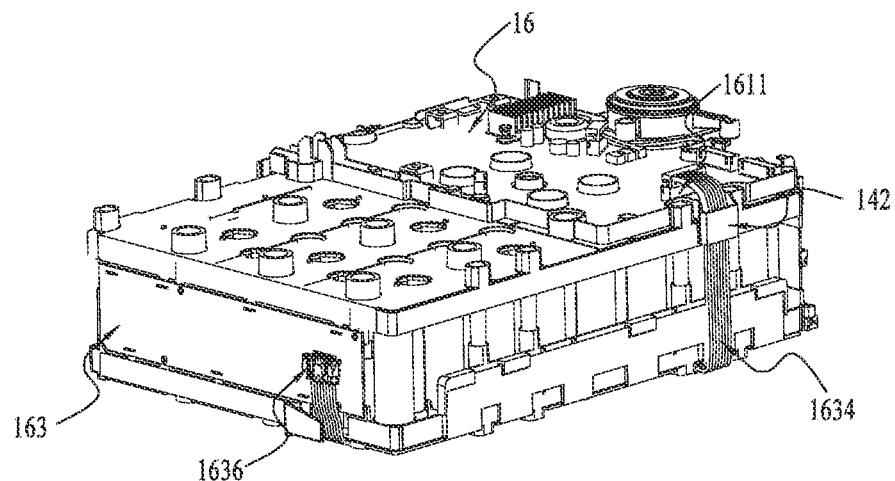
FIG. 14 is an internal structural view of the battery pack body without the housing and the cable of the battery pack body in FIG. 1.
Figure 15:
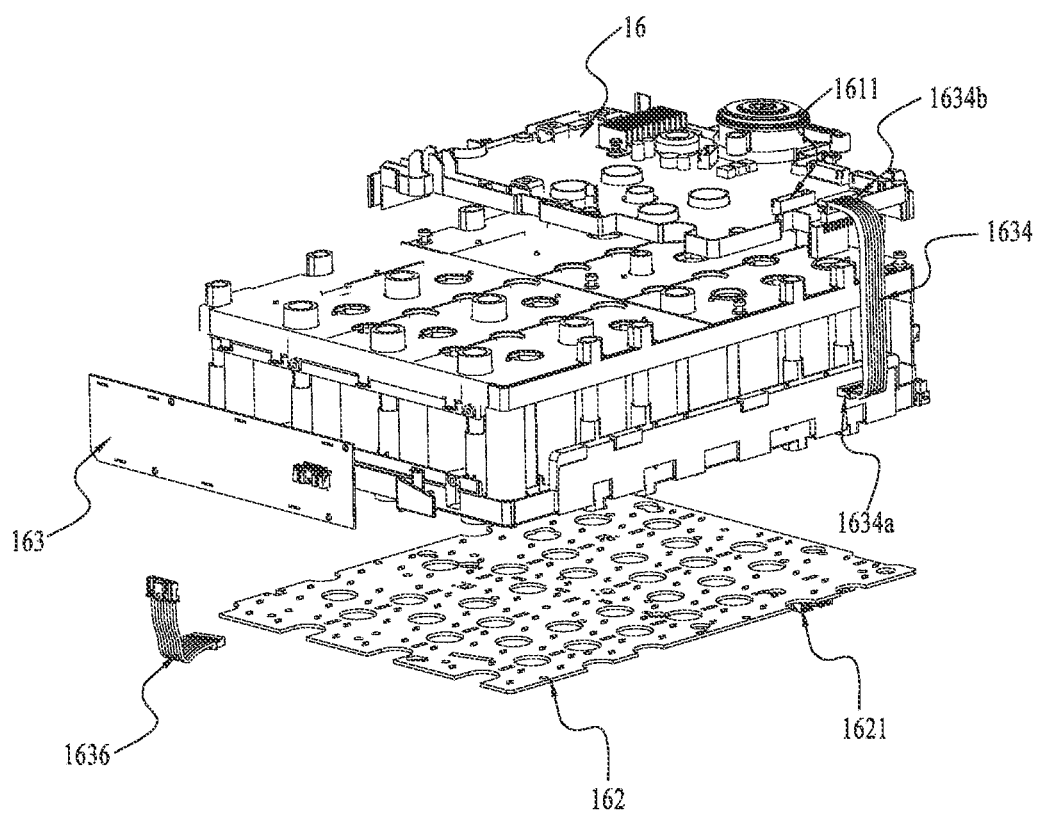
FIG. 15 is an exploded view of FIG. 14 showing the connections between each circuit board.
Figure 16:
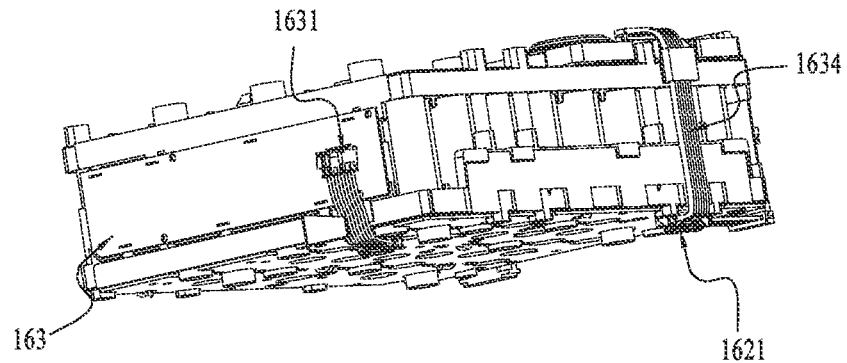
FIG. 16 is an internal structural view from another perspective of the battery pack body without the housing and the cable in FIG. 1.

As shown in FIG. 14 to FIG. 16, the battery pack further includes a temperature measuring circuit board 162 and a sub-circuit board 163. The temperature measuring circuit board 162 is provided with an NTC for detecting the temperature of the battery cell. Of course, the temperature measuring circuit board 162 also adopts other temperature measuring elements to detect the temperature of the battery cell. The body of the temperature measuring circuit board 162 is provided with a conductive line, that is, the line is in the inside, and a temperature measuring wiring port 1621 is electrically connected with the conductive line. The temperature measuring wiring port 1621 is arranged on one side of the temperature measuring circuit board 162. As one of the examples, the temperature measuring wiring port 1621 is arranged on the right side of the temperature measuring circuit board 162. In addition, in one example, the temperature measuring circuit board might be integrated with the connector into a circuit board. In another example, the temperature measuring circuit board and the connector are two separate circuit boards respectively.

The body of the main circuit board 16 is provided with a conductor layer and a main wiring port 1611, which is electrically connected with the conductor layer. The main wiring port 1611 and the temperature measuring wiring port 1621 are connected by a pluggable wire 1636 to realize the signal transmission. The signals herein include but are not limited to voltage signals, temperature signals, current signals and/or communication signals.

As a lead board, the sub-circuit board 163 includes a secondary access interface 1631, a secondary connect interface 1632 and the secondary routing layer. And the secondary routing layer is electrically connected to the secondary access interface 1631 and the secondary connect interface 1632. It should be noted that, in a specific example, the battery pack might include a sub-circuit board; In another specific example, the battery pack might include a plurality of sub-circuit boards. For example, as shown in FIG. 15, the battery pack includes two sub-circuit boards 163. One of the sub-circuit boards is electrically connected to the temperature measuring circuit board through a pluggable wire 1636, and the other of the sub-circuit board is electrically connected to the main circuit. An electrical connection is established between the two sub-circuit boards through external wires, an electrical connection can also be established through the internal routing of the temperature measuring circuit board in order to achieve the signal transmission.

Figure 12:
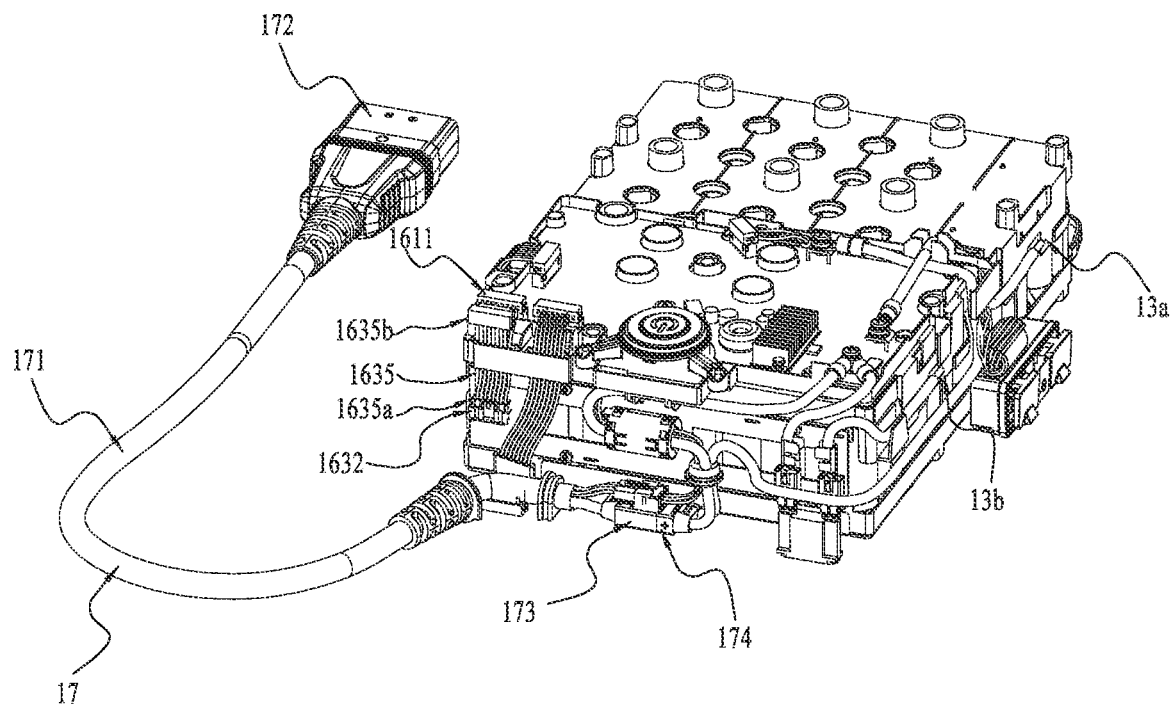
FIG. 12 is an internal structural view of the battery pack body without the housing in FIG. 1.

Referring to FIG. 12, FIG. 15 and FIG. 16, the secondary access interface 1631 is electrically connected to the temperature measuring wiring port 1621. The secondary access interface 1631 is electrically connected to the main wiring port 1611. Specifically, the secondary access interface 1631 and the temperature measuring wiring port 1621 are electrically connected by a first wire 1634. The first wire 1634 includes a first terminal 1634a and a second terminal 1634b. The connection between the first terminal 1634a and the temperature measuring wiring port 1621 is pluggable. And the connection between the second terminal 1634b and the secondary access interface 1631 is pluggable. The second connect interface 1632 is electrically connected to the main wiring port 1611 through a second wire 1635. The second wire 1635 includes a third terminal 1635a and a fourth terminal 1635b. The third terminal 1635a and the secondary connect interface 1632 are pluggable connection. The fourth terminal 1635b and the main wiring port 1611 are pluggable connection.

Through the design of the sub-circuit board, it avoids the disjointed connection between the temperature measuring circuit board and the main circuit board caused by the direct connection using multiple wires, which is not conductive to the wire arrangement and assembly in the battery pack. It should be noted that the number and position of interfaces of each circuit board are described herein for convenience of description. In fact, the number of interfaces and the actual position of each circuit board can be designed according to actual requirements.

As shown in FIG. 14 and FIG. 15, the main circuit board 16 is disposed on the rear side near the housing of the frame 14, the temperature measuring circuit board 162 is disposed on the front side of the bracket near the housing, and the sub-circuit board 163 is disposed on the upper or the lower side of the frame 14. The secondary connect interface 1632 is disposed on a side of the secondary circuit board 163 which is adjacent to the temperature measurement circuit board 162. Possibly, in another example, the main circuit board includes a plurality of main connection interfaces, and the secondary circuit board includes a plurality of secondary connection interfaces, and each interface could be electrically connected by pluggable wires. As one of the examples, the backpack battery pack further includes a plurality of sub-circuit boards. Multiple sub-circuit boards may be disposed at different positions respectively to simplify the connection within the battery pack.

Referring to FIG. 15 and FIG. 16, the frame 14 further includes a receiving portion 142, which is disposed on the lower side of the frame to receive the first wire 1634 when it is electrically connected to the temperature measuring interface. Of course, the receiving portion may be provided at other positions to accommodate the electric wires.

For the convenience of carrying, a handle 19 is arranged at the upper end of the battery pack body 10. The handle 19 employs a soft handle 19 having a buffer function for carrying the battery pack body 10. The handle 19 is also used to carry a whole backpack battery pack. It can alleviate the weight of the battery pack body 10 while improving the comfort for the hand when carrying the battery pack body 10 or wearing the backpack battery.

As shown in FIG. 7 and FIG. 10, a recess portion 128 is formed at the upper end of housing 12. A handle 19 includes a handle fixing portion 191 and a carrying portion 192. The handle fixing portion 191 is fixed at the upper end of the housing 12 and located on the left and right sides of the recess portion 128. And the carrying portion 192 is disposed between the handle fixing portions 191. The projection formed by the recess 128 in the front-rear direction has a grooved surface. And the maximum distance of the carrying portion formed in the front-rear projection from the groove surface is 40 mm. The selection of the maximum distance avoids the foreign bodies such as leaves, grass and vines that may be stuck in the recess portion of the housing when the handle is in state of freedom. The space formed by the recess portion of the housing is convenient for the user to reach their hand in and hold the handle. Meanwhile, the size of the battery pack body in the up and down direction is further reduced so that the structure is more compact.

As shown in FIG. 3, the housing 12 includes a front housing 125 and a rear housing 126. And the front housing 125 and the rear housing are combined along the direction parallel to the length of the battery cell, that is, the front housing 125 and the rear housing 12 are combined along the front-rear direction. An elastic member 15 is disposed between the front housing 125 and the rear housing 126 for closing the joint of the front housing 125 and the rear housing 126 to prevent dust and water from entering the interior of the housing 12. Specifically, the elastic member 15 is a spring washer.

The front housing 125 includes a front flow guide wall 152a disposed inside the front housing. The front flow guide wall 152a is perpendicularly to the front surface of the housing and extends to the inside of the housing. The rear housing 125 includes a rear flow guide wall 152b disposed inside the rear housing, the rear flow guiding wall 152b being perpendicularly to the rear surface of the housing and extending to the inside of the housing. The front flow guide wall 152a and the rear flow guide wall 152b are correspondingly arranged in a direction parallel to the length of the battery cell 11. When the front housing 125 and the rear housing 126 are combined in the direction parallel to the longitudinal direction of the battery cell 11, the front flow guide wall 152a and the rear flow guide wall 152b are combined to form a confined space capable of accommodating the battery cells. The front flow guide wall 152a, the rear flow guiding wall 152b and a shell wall 127 form a channel to guide the water flow and prevent it from entering the confined space. A flow guide hole 153 is disposed at the lower end of the housing 12. And the water entering the inside of the housing 12 flows through a flow guide groove 151 and then flows out from the flow guide hole 153.

Figure 9:
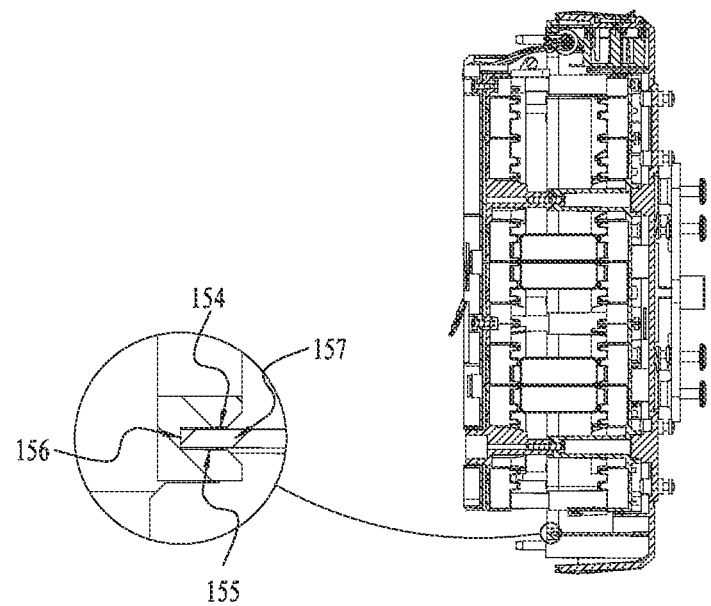
FIG. 9 is a cross-sectional view of the battery pack body taken along line B-B in FIG. 7.

Referring to FIG. 7 to FIG. 9, the front flow guide wall 152a includes a first stopping surface 154 and a second stopping surface 155. A groove portion 156 is disposed between the first stopping surface 154 and the second stopping surface 155. When the front housing 125 and the rear housing 126 are combined along the front-rear direction, a projecting portion 157 of the rear flow guide flow wall 152b is matched with the groove portion 156. The first stopping surface 154 and the second stopping face 155 restrict the movement of the rear flow guide wall 152b in the left-right direction, and further prevent water and dust from entering the cell and the main circuit board while tightly combining the front housing and rear housing. As one of the examples, an elastic member 15 might be set at the junction of the front flow guide wall 152a and the rear flow guide wall 152b.

A wearable device 20 includes a strap 21 for a user to carry the battery pack body 10 on the back and a belt 22 that can be wrapped around the user's waist, so that the battery pack body 10 can be securely fixed and carried on the user's back. Most of the weight of the battery pack body 10 can be transferred on the user's buttocks by the belt 22, thus reducing the burden on the user's shoulder. The belt 22 and the straps 21 are detachably connected by a connecting belt. The belt 22 and the straps 21 can be used separately or be used simultaneously by a connecting belt.

The wearable battery pack 100 further includes a battery pack body 10, a wearable device 20, a first locking device 31, and a second locking device 32. The battery pack body 10 and the wearable device 20 work together and form a detachable active connection.

Figure 17:
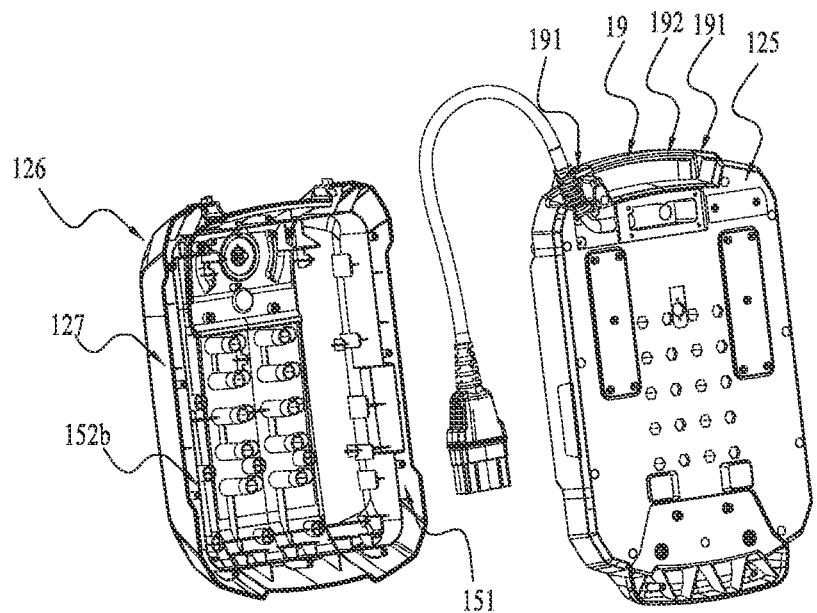
FIG. 17 is a structural view of a front housing and a rear housing of the wearable battery pack in FIG. 1.
Figure 18:
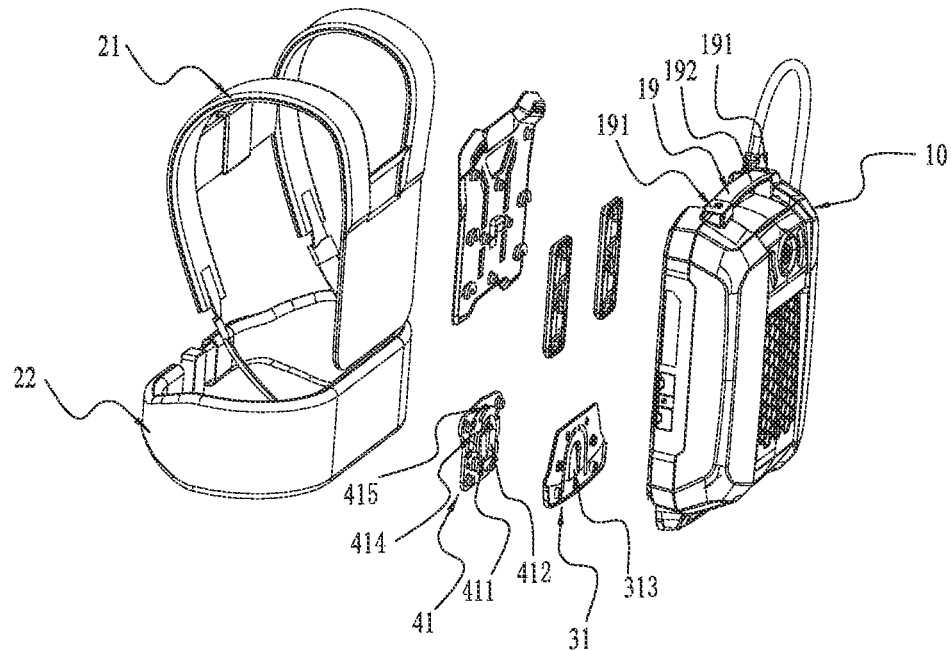
FIG. 18 is an exploded view of the wearable battery pack in FIG. 1.
Figure 19:
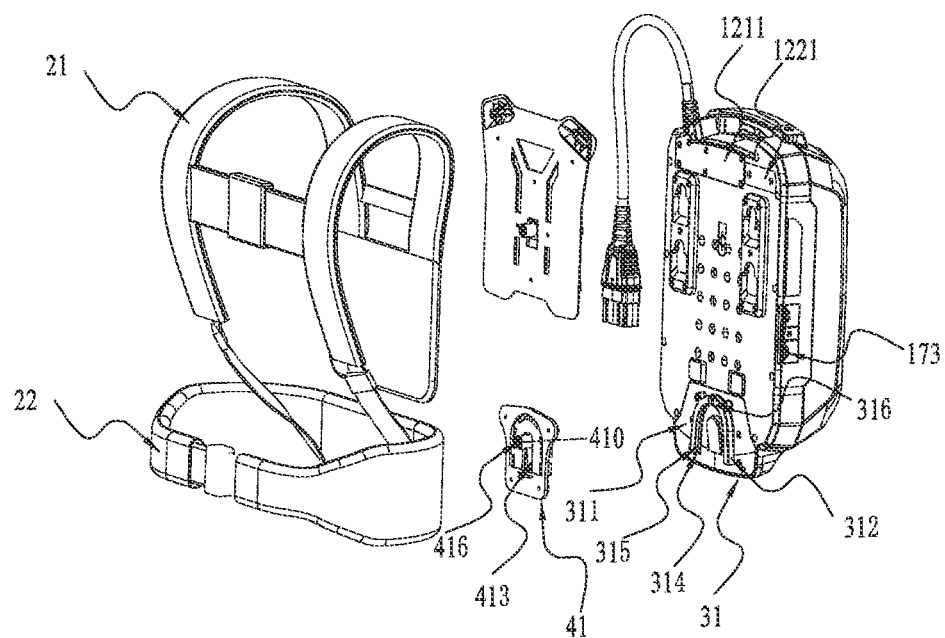
FIG. 19 is an exploded view from another perspective of the wearable battery pack in FIG. 1.

Referring to FIG. 17 and FIG. 18, the first locking device 31 is fixedly connected to the battery pack body 10. Specifically, the first locking device 31 is fixed to the front surface of the battery pack body 10 near the back of the user. The second locking device 42 is fixedly coupled to the wearable device 20. The second locking device 41 is fixedly connected with the wearable device 20. The first locking device 31 is provided with a first locking portion 311 and a first rotating portion 312, and the second locking device 41 is provided with a second locking portion 411 and a second rotating portion 412. The second locking portion 411 has the locking state and the unlocking state. During the locking state, the second locking part 411 locks the first locking part to maintain the relative position of the first locking device 31 and the second locking device 41, while the first locking portion 311 is unlocked during the unlock state to enable the first locking device 31 to be released from the second locking device 41. The second locking device 41 also includes an operating portion 416 for the user to disengage the battery pack body 10 from the wearable device 20 when needed.

As a specific example, the first locking device 31 is fixed on the plane near the user's back of the battery pack body 10 as shown in FIG. 17 and FIG. 18. In other words, the first locking device 31 is fixed on the front surface of the battery pack body 10. Specifically, the first locking device 31 includes a first locking portion 311 and a first rotating portion 312. More specifically, the first locking portion 311 includes a first elastic piece 313 and a guide-track groove 314, and the first rotating portion 312 is formed with a first curved surface 316 that is connected to the guide-track groove 314.

The second locking device 41 is fixed to the plane of the wearable device 20, which is used for carrying the battery pack. Specifically, the second locking device 41 includes a second locking portion 411, a second rotating portion 412, and an operating portion 416 for operating by a user. More specifically, the second locking portion 411 includes not only a slot guide 414 that matches the guide-track groove 314 and the first curved surface 316, but also a second elastic piece 413 that matches the first elastic piece 313. Under the guidance of the guide-track groove 314, the slot guide 414 is coupled to the guide-track groove 314 from the bottom to the top. At the same time, the second elastic piece 413 squeezes the first elastic piece 313 along the direction parallel to the length of the battery cell 11. The stop surface 315 of the guide-track groove 314 restrict the movement of the rail in the left-right direction, thus the slot guide is locked in the guide-track groove 314 in the left-right direction.

The first rotating portion 312 includes a first curved surface 316. The second rotating portion 412 includes a second curved surface 415 that might combine with the first curved surface 316. The slide guide 414 is coupled to the guide-track groove 314 from the bottom up. The second curved surface is coupled to the first curved surface 316, and the first curved surface 316 serves as a stop surface to stop the downward displacement of the battery device due to the effects of gravity, keeping the slide guide 414 in a locked state. When the slide guide 414 is locked, the second rotation portion 412 would move about the axis 410, which is parallel to the longitudinal direction of the battery cell 11 at a predetermined angle. Specifically, the second curved surface 415 is rotated at a predetermined angle with respect to the first curved surface 316 in the left-right direction, wherein the preset angle ranges from 0° to 5°. In this way, when the user carries the battery pack by the wearable device 20, the wearable device 20 is configured with a small angle (0~5°) adjustment in the left-right direction, therefore the wearing is more comfortable, and relieving the fatigue of shoulder or waist caused by long-term carrying of the battery pack body 10.

In order to quickly disengage the battery pack body 10 from the wearable arrangement 20 when needed, the second locking device 41 further includes an operating portion 416 for the user to control the second locking device 41. Specifically, the operating portion 416 is a protrusion disposed on the second elastic piece 413, and the user presses the protrusion so that the second elastic piece 413 is roughly in the same plane with the front plane of the battery pack body, that is, the second elastic piece 413 is unlocked. The separation of the second locking device 41 and the first locking device 31 can be achieved by moving the slide guide 414 from the top to the bottom along the guide-track groove 314, and then the rapid separation of the wearable device 20 and the battery pack body 10 can be realized. It should be stressed that the wearing device 20 herein may be a shoulder strap 21 for the user wearing on the shoulder, or a waist belt 22 for the user tying around the waist, or a combination of the two.

Figure 20:
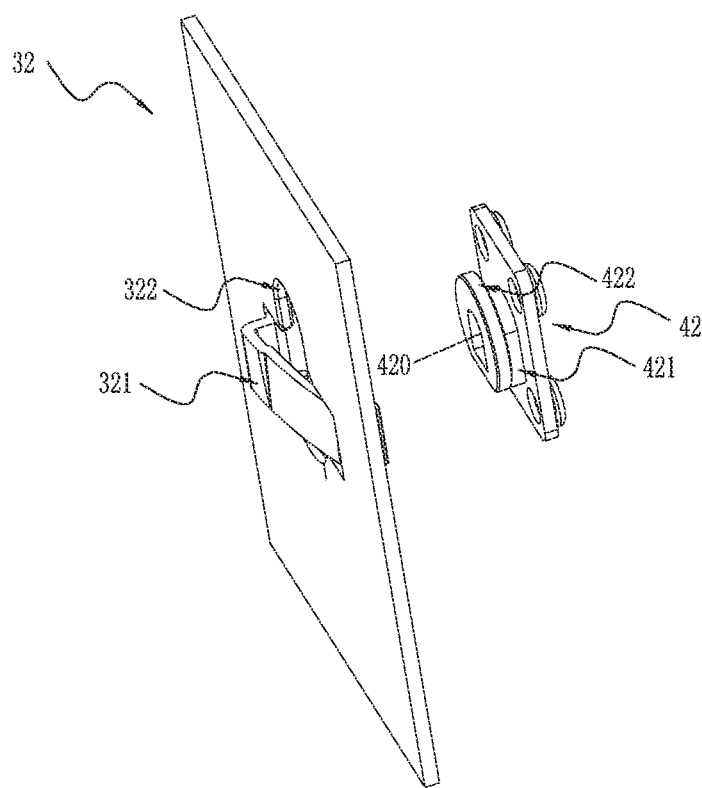
FIG. 20 is a structural view showing the structure of a first locking portion and a second locking portion of one of the examples.
Figure 21:
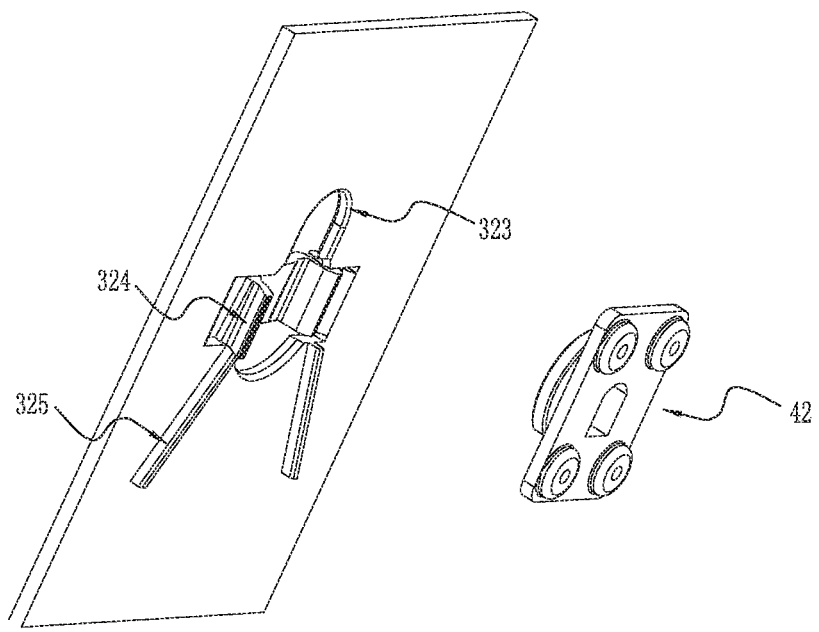
FIG. 21 is a structural view from another perspective showing the structure of a first locking portion and a second locking portion of one of the examples.

Referring to FIG. 20 to FIG. 21, the first locking device 32 includes a first elastic piece 321, a slide rail 322, and a first curved surface 323. The first elastic piece 321 is disposed at a lower end of the slide rail 322. The first elastic piece 321 has a locked status and an unlocked status. The second locking device 42 includes a chute 421 and a second curved surface 422. In this example, the second locking device 42 is fixedly connected to the wearable device 20.

The chute 421 is coupled to the slide rail 322 from bottom up. The first curved surface 323 is coupled to the second curved surface 422. The upper surface of the first elastic piece 321 is served as a stop surface to stop chute 421 moving downward, thus the first elastic piece 321 is locked to enable the first locking device 32 and the second locking device 42 in a relative position. Further, the wearable device 20 is coupled to the battery pack body 10 to limit the downward displacement of the battery pack caused by its own weight.

When the first elastic piece 321 is locked, the second curved surface 422 rotates about an axis 420, which is parallel to the longitudinal direction of the battery cell 11. Specifically, the second curved surface 422 is rotated at a predetermined angle with respect to the first curved surface 323 in the left-right direction. The left and right planes of the slide rail 322 as limiting surfaces restrict the rotation of the second curved surface 422 about the axis 420 respectively. The preset angle ranges from 0° to 5°. In this way, when the second locking device 442 is coupled to the first locking device 32 and the wearing device 20 is worn on the back of the user to carry the battery pack body 10, the battery pack rotates at a small angle with respect to the wearing device, so that the user is more comfortable, and relieving the fatigue of the shoulder or waist after long-term carrying.

For the convenience of operation, the first locking device 32 further includes an operating portion 324 for the user to control the first elastic piece 321. Specifically, the operating portion 324 is disposed at one end of the left or right side of the first elastic piece 321. When the user presses the operating portion 324, the first elastic piece 321 is in the unlocking state. In the present example, the first locking device 32 is fixedly connected to the battery pack body 10. When required, pressing the operating portion 324 enable the first elastic piece 321 to shift in the front-rear direction, and the first elastic piece 321 is in the unlocking state. The chute disengages from the slide rail from top to bottom, thus realizing the rapid disconnection of the wearable device 20 and the battery pack body 10.

In order to prevent the battery pack from falling when the wearable device 20 and the battery pack body 10 are quickly disengaged, the first locking device 32 further includes a stopping portion 325, which is disposed on the lower side of the first elastic piece 321. Specifically, the stopping portion 325 includes two stopping bands arranged at a certain angle. The extension cords of the two stopping bands intersect at the upper side of the stopping band. When the user presses the operating portion 324 to disengage the battery pack body 10 from the wearable device 20, the stopping portion 325 stops the downward displacement of the battery pack caused by its own gravity, therefore, avoiding the possibility of the battery pack body 10 falling directly.

Figure 22:
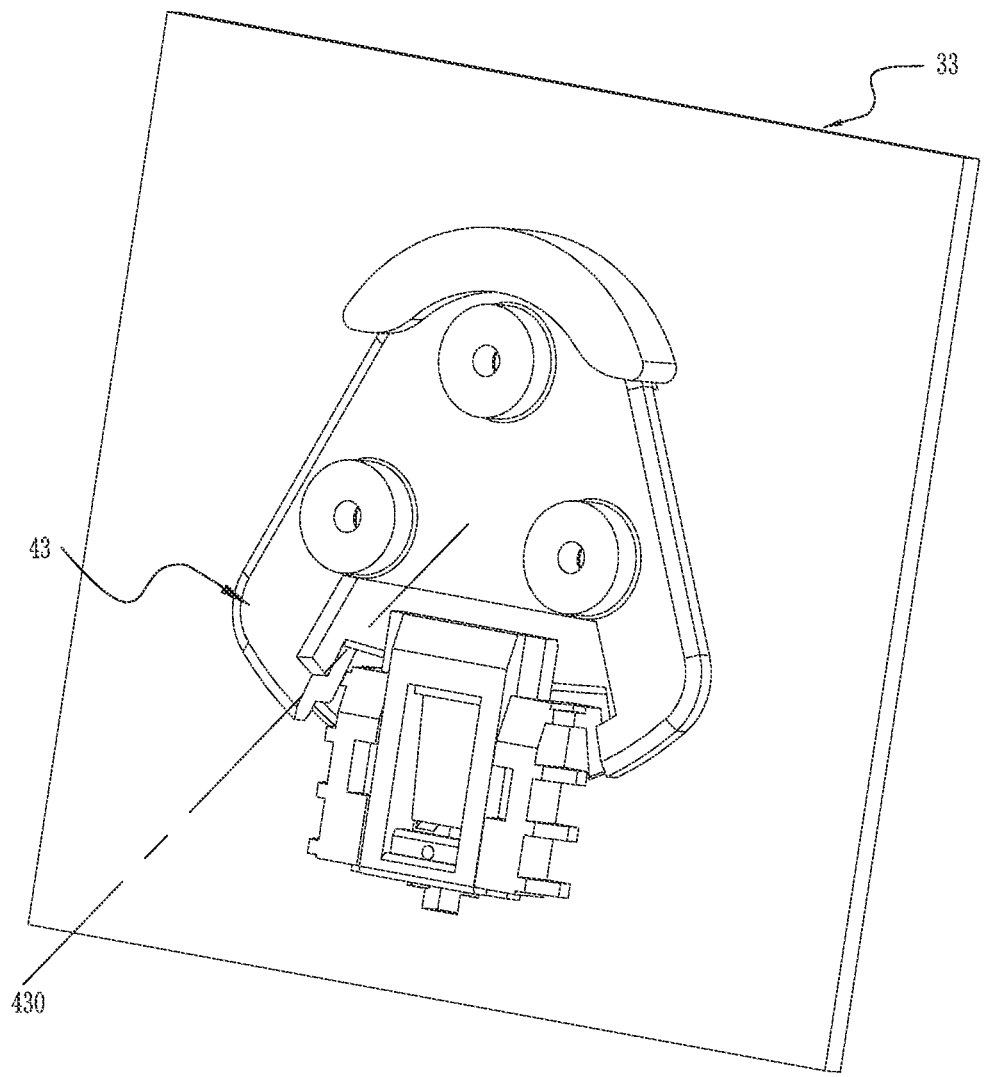
FIG. 22 is a structural view of a combined structure of a first locking portion and a second locking portion of another example.
Figure 23:
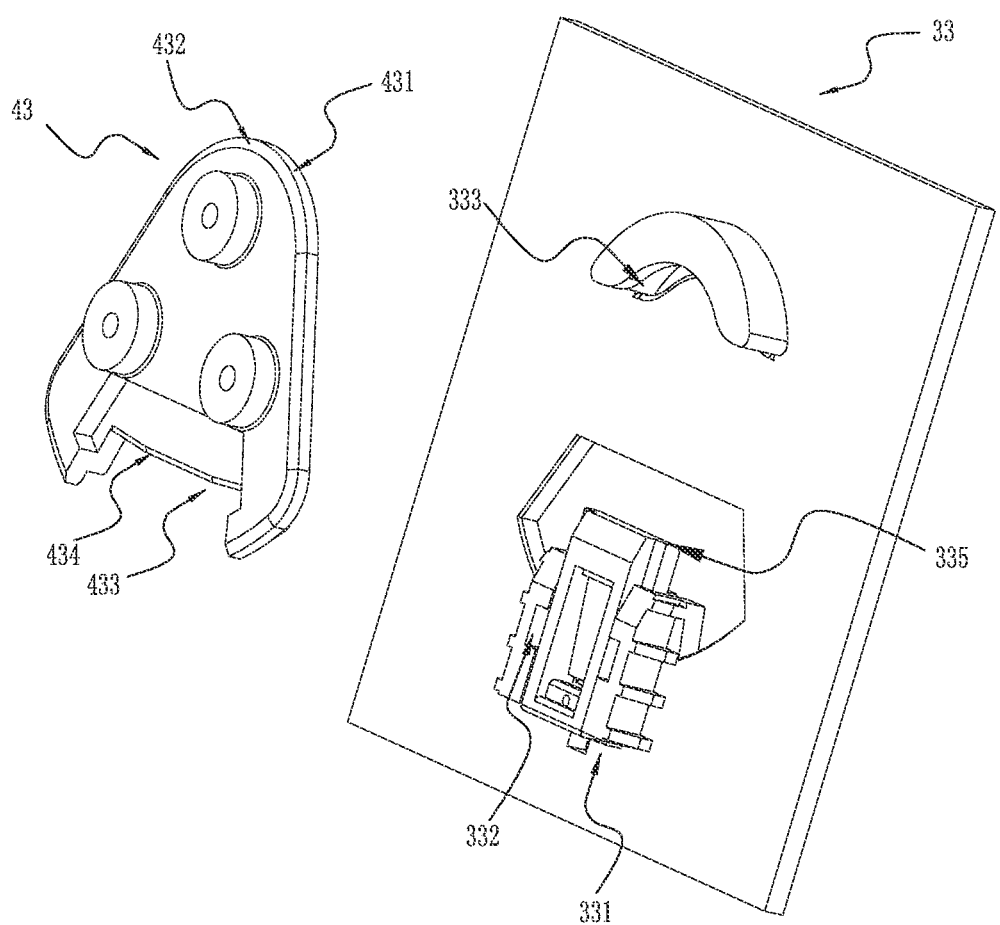
FIG. 23 is a structural view of a first locking portion and a second locking portion of another example.
Figure 24:
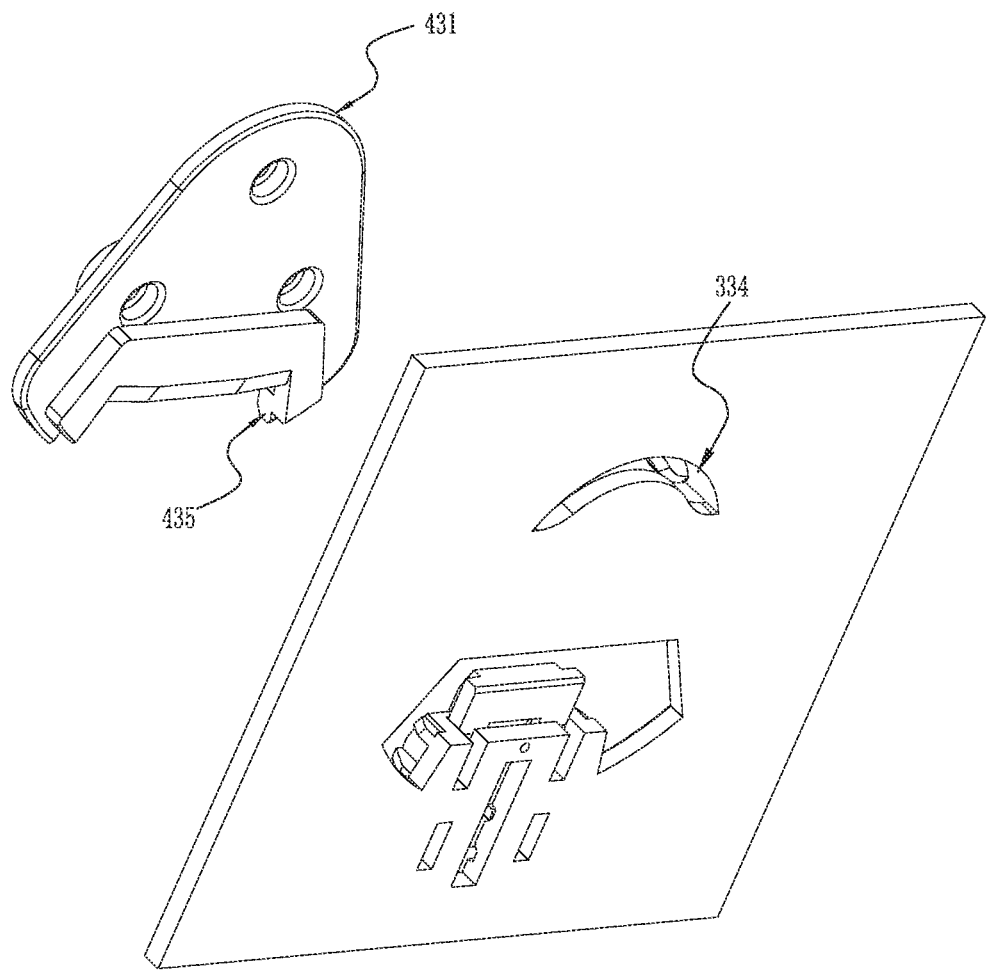
FIG. 24 is a structural view from another perspective of a first locking portion and a second locking portion of another example.

Referring to FIG. 22 to FIG. 24, the first locking device 33 includes a buckle 331 and a latching groove 332. The buckle 331 and the latching groove 332 cooperate with each other so that the first locking portion has a locked state and an unlocked state. When the buckle 331 is in the first position by sliding along the latching groove 332 from the bottom to the top, the first locking portion is in the locking state, while the first locking portion is in the unlocking state when the buckle 331 is in the second position by sliding down along the latching groove 332. To guide the second locking device 43 from the bottom up to couple to the first locking device 33, the first locking device 33 further includes a guiding groove 333 and a first curved surface 334.

The second locking device 43 includes a curved guide rail 431, a second curved surface 432 and an opening 433. The buckle 331 is at least partially located in the opening 433. The opening 433 is formed with an upper surface 434, which matches with the upper surface 335 of the latching groove 335.

The curved guide rail 431 is coupled to the guiding groove 333 from bottom up. The user operates the buckle 331 to lock the first locking device 33. At this time, the buckle 331 is in the first position, the upper surface 434 of the opening being in contact with the upper surface of the lock groove 335. And utilizing the upper surface of the latching groove 332 to stop the downward displacement of the second locking device 43. In this manner, the second locking device 43 that is fixed to the wearable device 20 is coupled from the bottom up to the first locking device that fixed to the battery pack body 10. The user operates the buckle 331 to lock the first locking device 33, and then combines the wearable device 20 with the battery pack body 10. When the user wears the wearable device 20 to carry the battery pack body 10, the downward displacement of the battery pack body 10 caused by its weight can be avoided.

When the second locking device 43 is coupled to the first locking device 33 and the first locking device 33 is locked, the second curved surface 432 is in contact with the first curved surface 334. And the second curved surface 432 rotates about an axis 430 so that the wearable device 20 rotates relative to the battery pack body 10. The opening 433 is also provided with a stop surface 435, as shown in FIG. 17. The stop surfaces 435 are respectively located on the left and right sides of the locking groove 332. When the second curved surface 432 rotates about the axis 430, the stop surface 435 and the left and right sides of the latching groove 332 work together to restrict the rotation angle of the second curved surface 432 around the axis 430. Specifically, the rotation angle ranges from 0° to 5°. According to this design, while avoiding the instability of the battery pack body 10 affecting the user's operation, it can relieve the fatigue of the shoulder or waist due to the long-term carrying of the battery pack body 10, so that the user is more comfortable.

The buckle 331 is in the unlocking state operated by the user, and the upper surface of the latching groove is separated from the upper surface of the opening, so that the second locking device 43 is disengaged from the first locking device 33, thus realizing the rapid disconnection of the wearable device 20 and the battery pack body 10.

The above illustrates and describes basic principles, main features and advantages of the present disclosure. Those skilled in the art should appreciate that the above examples do not limit the present disclosure in any form. Technical solutions obtained by equivalent substitution or equivalent variations all fall within the scope of the present disclosure.

What is claimed is:

1. A wearable battery pack comprising:
   a battery pack body containing a battery pack electrically connected to a circuit board having a through hole; and
   a wearable device associated with the battery pack body configured and arranged to allow the battery pack body to be at least carried on a back of a user;
   wherein the battery pack body has a heat dissipation channel that extends from a first side of the battery pack body that is located adjacent to the back of the user when the battery pack body is carried on the back of the user to a second side of the battery pack body that is opposite to the first side and the heat dissipation channel passes through the through hole of the circuit board.

2. The wearable battery pack according to claim 1, wherein an extension direction of the heat dissipation channel is parallel to a length direction of the battery pack.

3. The wearable battery pack according to claim 1, wherein the battery pack comprises a plurality of battery cells, the plurality of battery cells are arranged to form a cell channel, and the cell channel is parallel to a length direction of the battery pack.

4. The wearable battery pack according to claim 1, wherein the battery pack comprises a plurality of battery cells, the plurality of battery cells are arranged to form a cell channel, and the heat dissipation channel passes through the cell channel.

5. The wearable battery pack according to claim 1, wherein the battery pack body comprises a first shell wall for at least forming the heat dissipation channel and a second shell wall for forming a receiving cavity for receiving the battery pack, the receiving cavity being sealed relative to the heat dissipation channel.

6. The wearable battery pack according to claim 5, wherein the first shell wall and the second shell wall are formed integrally.

7. The wearable battery pack according to claim 1, wherein the battery pack body comprises a display device coupled to the circuit board configured to display a battery quantity of the battery pack.

8. The wearable battery pack according to claim 1, wherein the battery pack body comprises an interface device electrically connected with the battery pack for coupling the battery pack to at least one of an external source or an external sink of electrical energy.

9. The wearable battery pack according to claim 1, wherein a ratio of a power capacity of the battery pack body to a total mass of the battery pack body is greater than 120 Wh/Kg.

10. The wearable battery pack according to claim 1, wherein a value range of a ratio between a sum of an area of a projection surface formed by the through hole in a first side to second side direction and an area of a projection surface formed by the circuit board in the first side to second direction is from 0.01 to 0.07.

11. The wearable battery pack according to claim 1, wherein a maximum projection surface formed in a first side to second side direction of the battery pack body is defined as a first projection surface and a ratio between a sum of an area of a projection surface in the first side to second side direction of the heat dissipation channel and an area of the first projective surface is from 0.004 to 0.012.

12. A wearable battery pack comprising:
    a battery pack body containing a battery pack;
    a wearable device associated with the battery pack body configured and arranged to allow the battery pack body to be at least carried on a back of a user;
    a first locking device formed with a first locking portion; and
    a second locking device formed with a second locking portion having a locked state and an unlocked state, the second locking device locking the first locking portion in the locked state to maintain the relative positions of the first locking device and the second locking device;
    wherein the first locking device is fixedly connected to the battery pack body, the second locking device is fixedly connected to the wearable device, and the second locking device includes an operating portion for the user to operate to control the second locking portion so that the user can remove the battery pack body from the wearable device when necessary.

13. The wearable battery pack according to claim 12, wherein the first locking device further comprises a first rotating portion, the second locking device comprises a second rotating portion which rotates about an axis, and the second rotating portion combined with the first rotating portion enables the wearable device to rotate relative to the battery pack body when the second locking portion is in the locked state.

14. The wearable battery pack according to claim 13, wherein the second rotating portion is coupled to the first rotating portion so that when the second locking portion is in a locked state the carrying device rotates at a preset angle relative to the battery pack body.

15. The wearable battery pack according to claim 13, wherein the first rotating portion further comprises a stop surface for stopping the second rotating portion and enabling the second rotating portion to rotate about an axis at a preset angle.

16. A wearable battery pack comprising:
a battery pack body containing a battery pack; and
a wearable device associated with the battery pack body configured and arranged to allow the battery pack body to be at least carried on a back of a user a carrying device;
wherein the battery pack body comprises a front housing, a rear housing couplable with front housing to form a receiving space capable of receiving the battery pack, and an elastic member, arranged between the front housing and the rear housing, to seal a joint formed when the front housing is coupled with the rear housing, and the battery pack body has a heat dissipation channel that extends from the front housing to the rear housing when the front housing is coupled with the rear housing.

17. The wearable battery pack according to claim 16, wherein a coupling direction of the front housing and the rear housing is parallel to a length direction of the battery pack.

18. The wearable battery pack according to claim 16, wherein the battery pack body further has a flow guide groove arranged along a front side of the battery pack body.

19. The wearable battery pack according to claim 18, wherein the battery pack body further has a flow guide hole arranged at one end of the flow guide groove.

* * * * *